Feb. 21, 1956  LA VERGNE H. WILLIAMS  2,736,023
RECORDER AND METHOD FOR RECORDING ELAPSED TIME
Filed Feb. 11, 1953                                    10 Sheets-Sheet 1

INVENTOR.
LA VERGNE H. WILLIAMS.
BY
Louis V. Lucia
ATTORNEY.

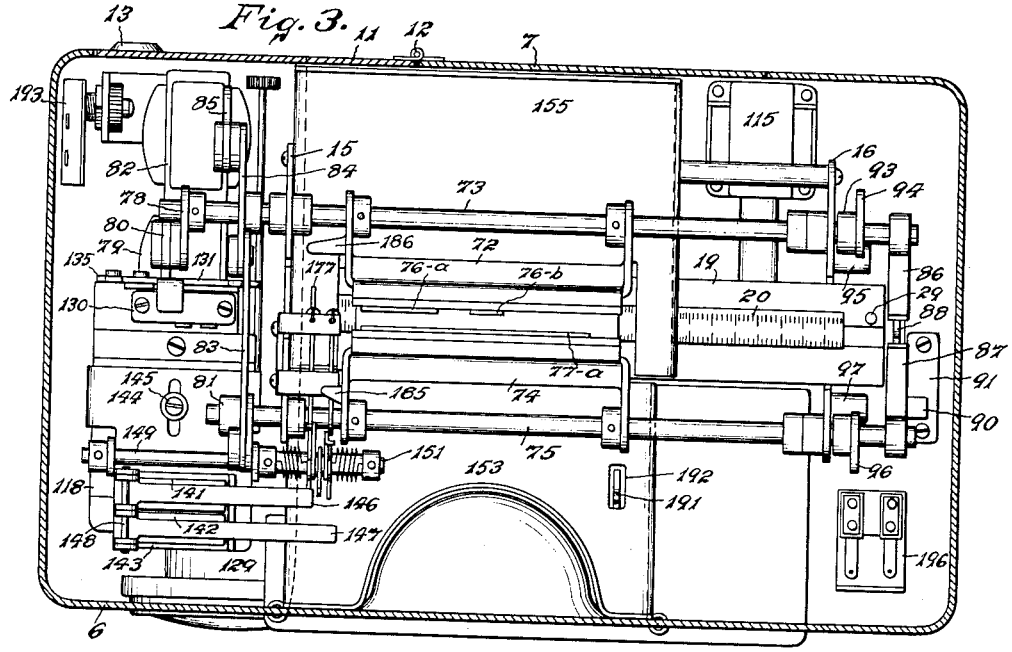
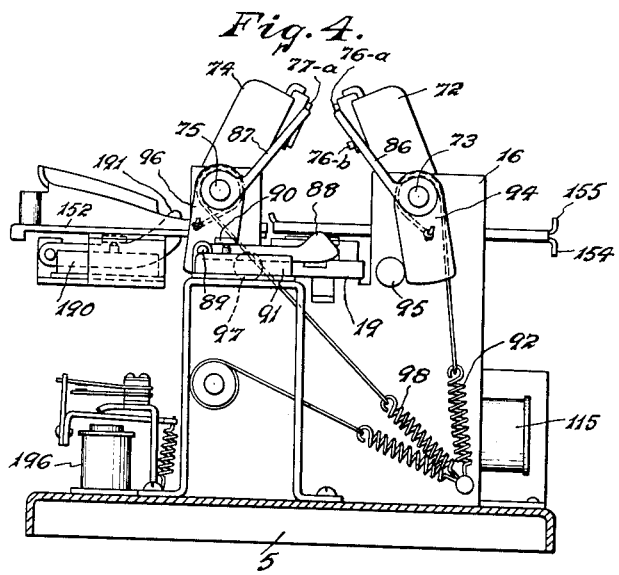

Feb. 21, 1956 LA VERGNE H. WILLIAMS 2,736,023
RECORDER AND METHOD FOR RECORDING ELAPSED TIME
Filed Feb. 11, 1953 10 Sheets-Sheet 3
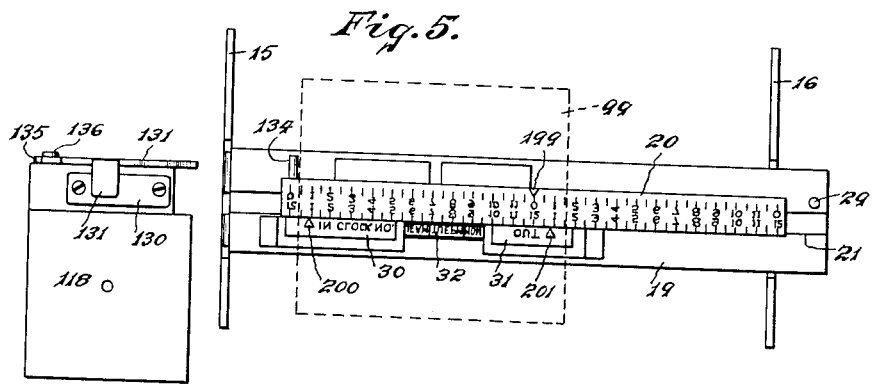
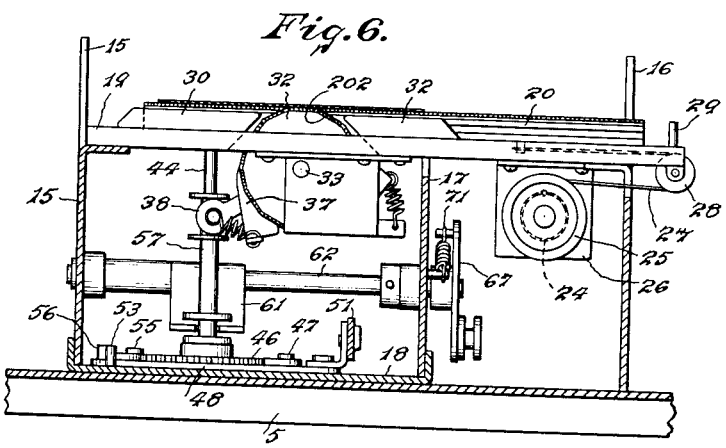
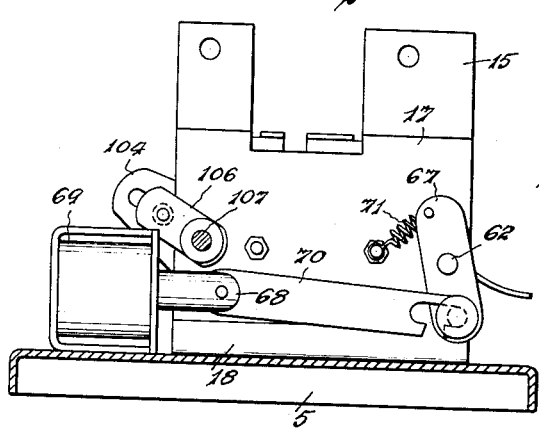
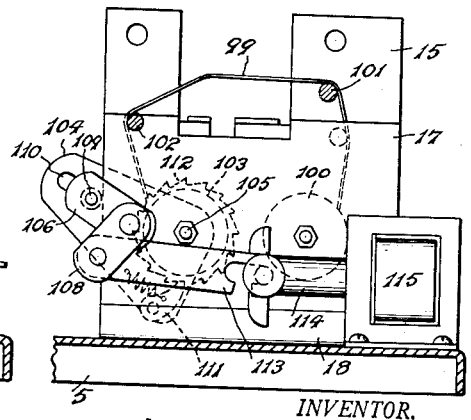
INVENTOR.
LA VERGNE H. WILLIAMS.
BY
Louis V. Lucia
ATTORNEY INVENTOR.
LA VERGNE H. WILLIAMS.
BY Louis V. Lucia
ATTORNEY.

INVENTOR.
LA VERGNE H. WILLIAMS.
BY Louis V. Lucia
ATTORNEY.

Feb. 21, 1956     LA VERGNE H. WILLIAMS     2,736,023
RECORDER AND METHOD FOR RECORDING ELAPSED TIME
Filed Feb. 11, 1953     10 Sheets-Sheet 8
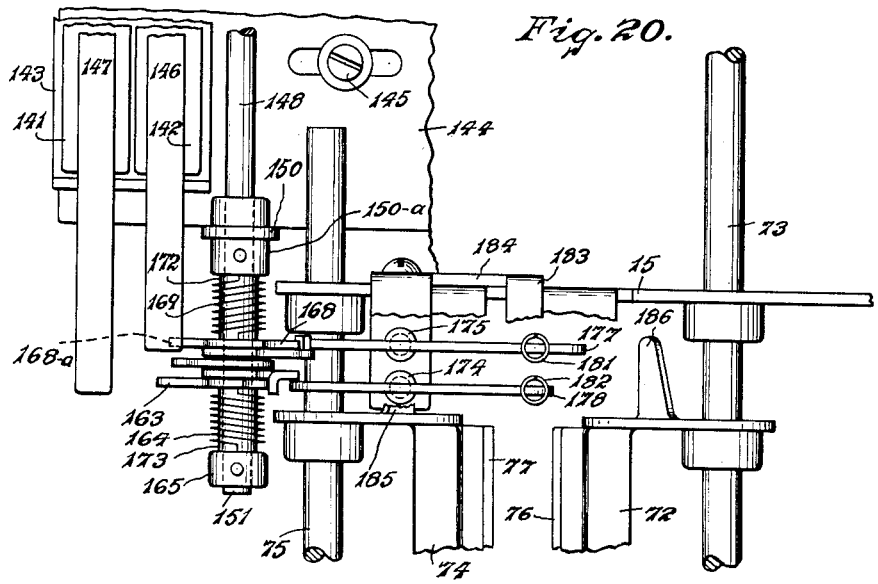
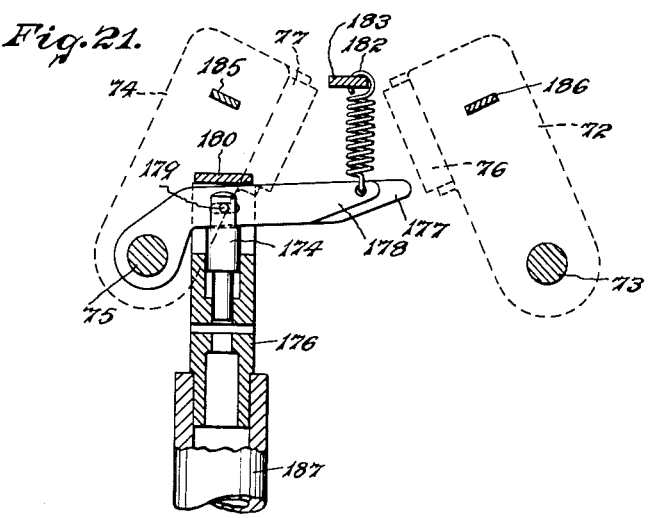
INVENTOR.
LaVERGNE H. WILLIAMS.
BY
Louis V. Lucia
ATTORNEY.

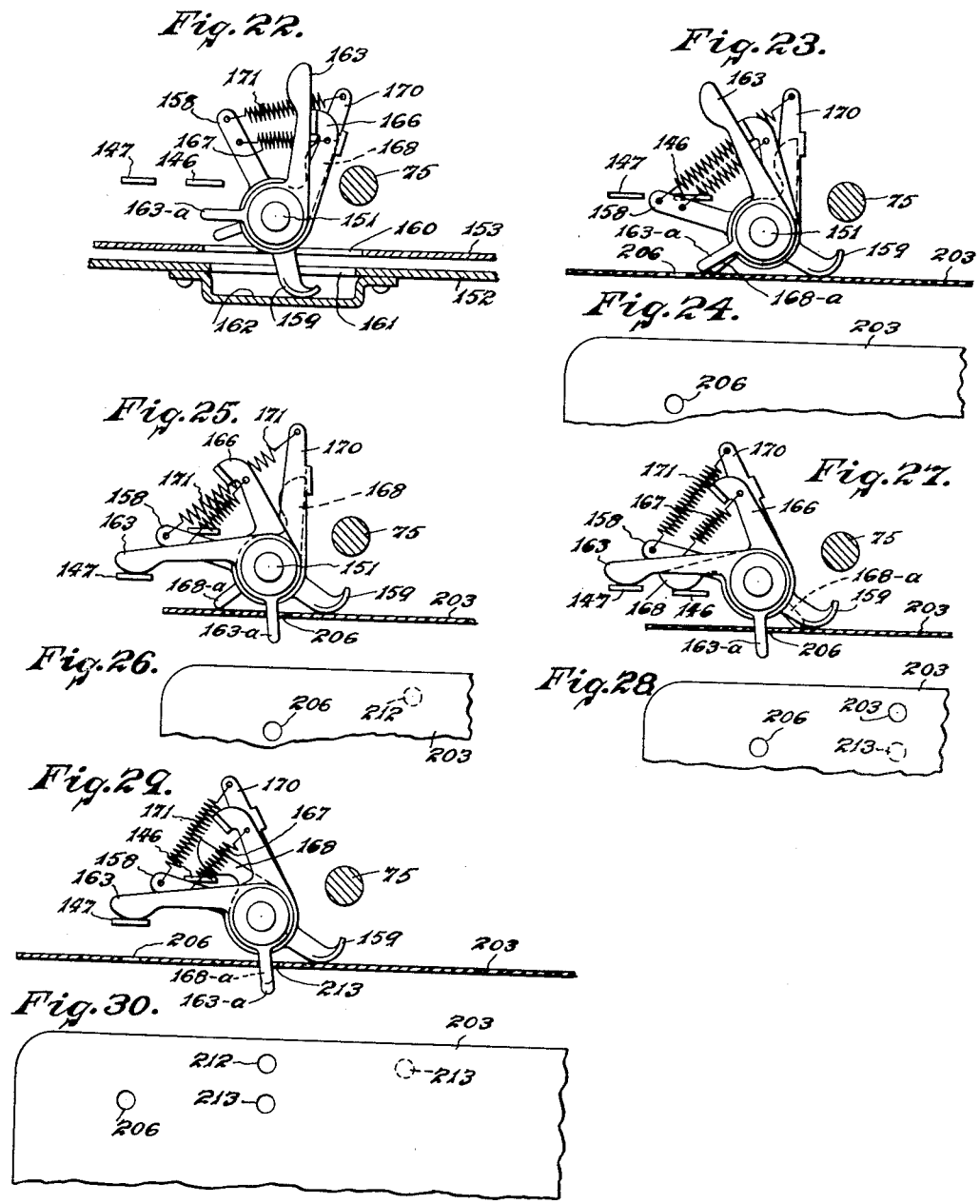

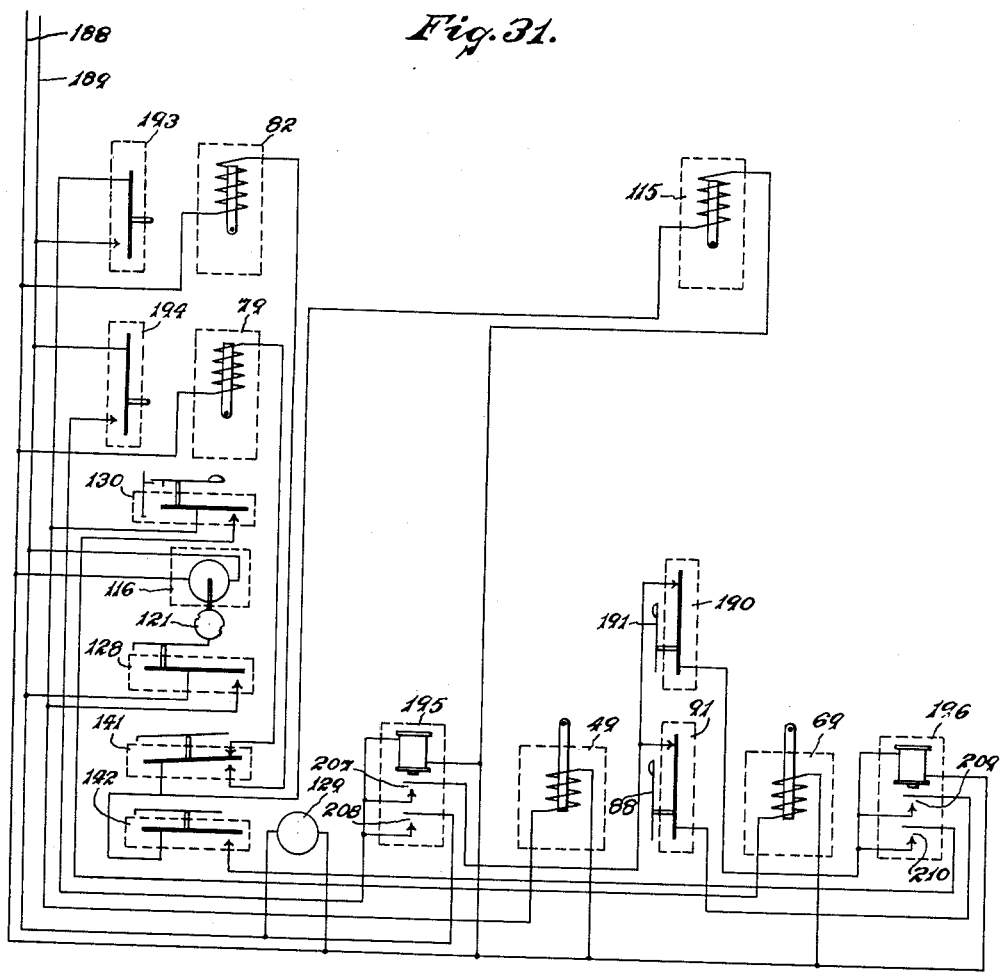

United States Patent Office 2,736,023
Patented Feb. 21, 1956

2,736,023

RECORDER AND METHOD FOR RECORDING ELAPSED TIME

La Vergne H. Williams, Columbia Lake, Conn.

Application February 11, 1953, Serial No. 336,325

15 Claims. (Cl. 346—82)

This invention relates to a recorder and method for recording elapsed time and more particularly to such a recorder which is adapted to record the elapsed time between a first and a second operation which are performed at the starting and stopping times of the worker, as fully described in my U. S. Patent No. 2,496,686, of February 7, 1950.

The primary object of the present invention is to provide an improved time recorder having novel and important advantages over the recorder described in the said patent.

A further object is the provision of an improved electric circuit for controlling the operation of the time recorder.

A still further object is the provision of a novel method of recording elapsed time upon a time card.

A still further object is the provision of a method for recording upon a card the starting time, the stopping time and the inbetween elapsed time and also showing upon said card whether the starting and stopping times were early or late.

Further objects and advantages of the present invention will be more clearly understood from the following description and from the accompanying drawings in which:

Fig. 3 is a plan view of the recorder, showing the case thereof in section.

Fig. 4 is a side view of a portion of the recording mechanism.

Fig. 5 is a plan view of another portion of said mechanism showing the movable stamping member.

Fig. 6 is a front view, partly in central vertical section, of another portion of the recording mechanism.

Fig. 7 is a side view of another portion of the mechanism.

Fig. 8 is a similar view showing another portion of the mechanism.

Fig. 20 is an enlarged plan view showing portions of the circuit control and card-punching mechanisms.

Fig. 21 is a side view, partly in central vertical section, of the card-punching mechanism.

Fig. 22 is a side view of the circuit control in normal position.

Fig. 23 is a similar view showing the position of the circuit control as a time card is being inserted into the recorder.

Fig. 24 is a plan view of a portion of the time card in the position in which it is shown in Fig. 23.

Fig. 25 is a side view of the circuit control showing the position thereof as it causes the first stamping operation upon the time card.

Fig. 26 is a plan view of a portion of the time card in the position in which it is shown in Fig. 25.

Fig. 27 is a similar view of the circuit control showing its position as it causes the second stamping operation upon the time card.

Fig. 28 is a plan view of a portion of the time card in the position in which it is shown in Fig. 27.

Fig. 29 is a side view of the circuit control showing the position thereof as it causes a third stamping operation upon the time card.

Fig. 30 is a plan view of a portion of the time card in the position in which it is shown in Fig. 29.

Fig. 31 is a diagrammatic view illustrating the electrical circuit for controlling the operations of my improved elapsed time recorder.

Figure 1:
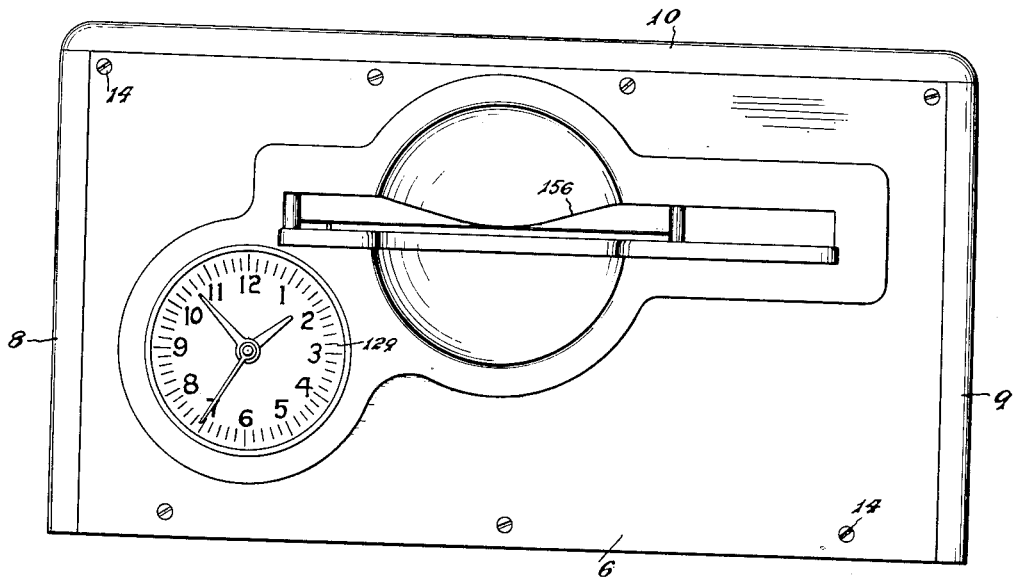
Fig. 1 is a front view of a time recorder embodying the present invention.
Figure 2:
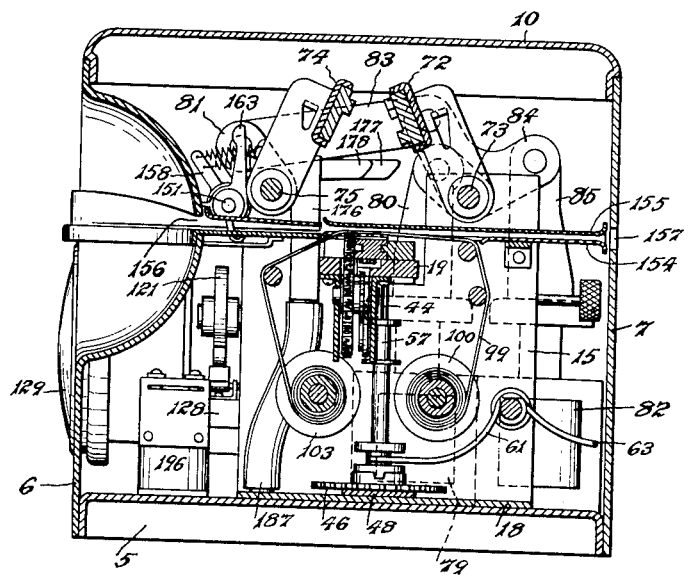
Fig. 2 is a side view of said time recorder in central vertical section.
Figure 9:
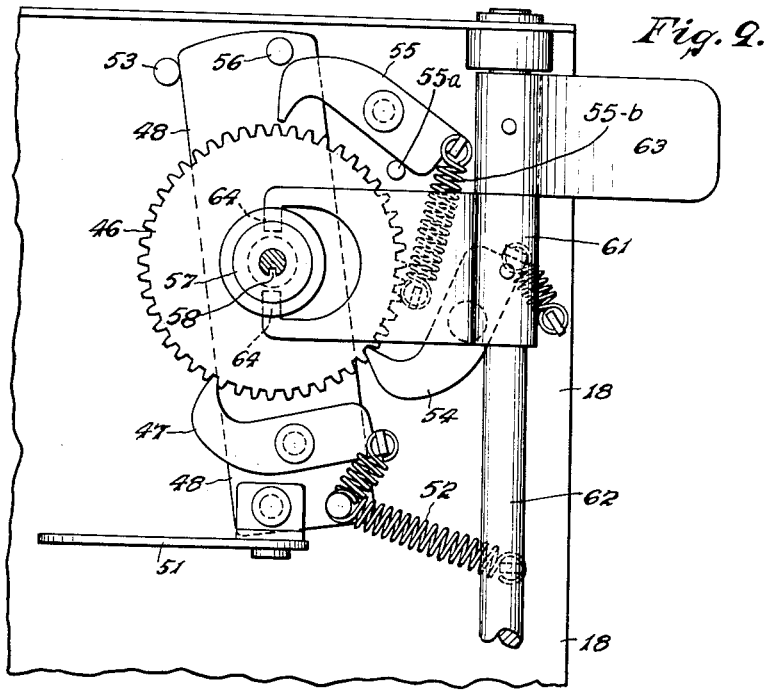
Fig. 9 is an enlarged plan view showing a portion of the stamp bar driving mechanism.
Figure 10:
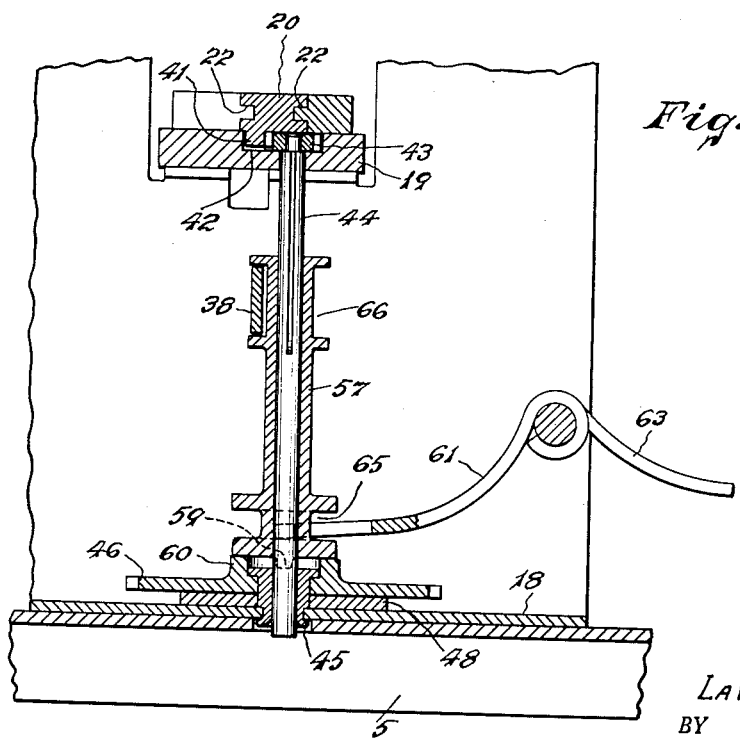
Fig. 10 is a side view thereof, partly in vertical section.
Figure 11:
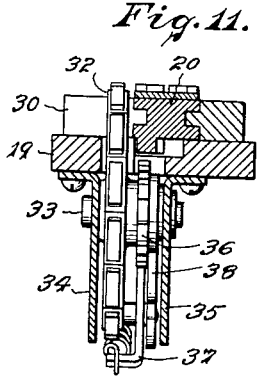
Fig. 11 is a sectional side view of the stamping mechanism.
Figure 12:
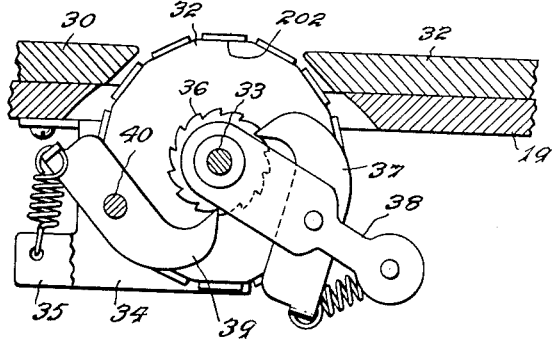
Fig. 12 is a rear view, partly in section, of a portion of the stamping mechanism.
Figure 13:
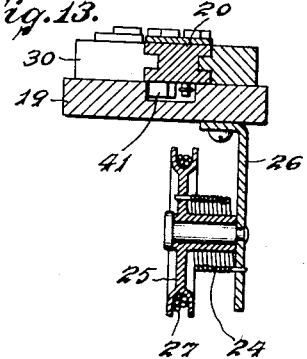
Fig. 13 is a sectional side view of the returning mechanism for the stamp bar.
Figure 14:
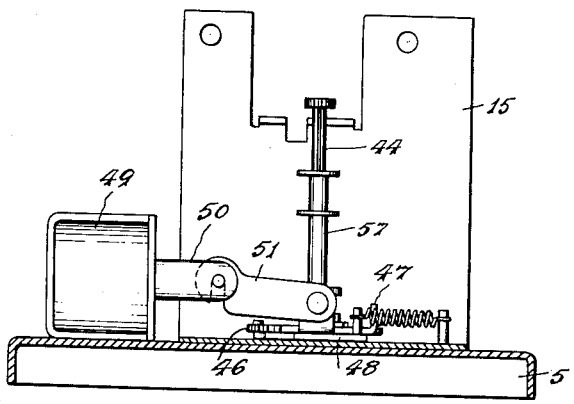
Fig. 14 is a partly sectional side view of the stamp bar operating mechanism.
Figure 15:
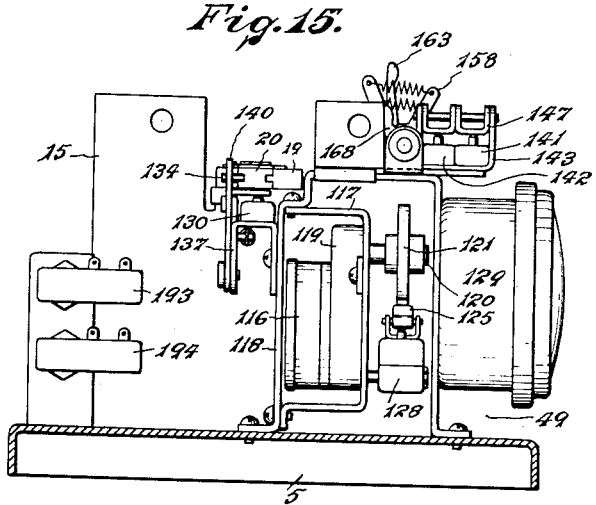
Fig. 15 is an opposite side view showing the timing mechanism.

In the embodiment of my invention which is illustrated in the drawings, my improved recorder includes a base 5 upon which there is assembled a casing that is constructed of a front panel 6, a rear panel 7, side panels 8 and 9 and a cover 10. The rear panel 7 may be provided with a suitable door 11 which is hinged at 12 and has a suitable lock 13 as shown in Fig. 3.

The said casing is assembled by suitable means, such as screws 14, and is mounted directly to the base 5 so that it may be disassembled therefrom to uncover the complete recording mechanism which will now be described.

The said mechanism includes a pair of end plates 15 and 16 and an intermediate plate 17 which support the mechanism. The plates 15 and 17 are mounted upon a sub-base 18 which is supported upon the base 5 and the end plate 16 is mounted directly upon the said base.

The stamping means which are provided in said mechanism include a stamp supporting bar 19 upon which there is slidably supported a stamp bar 20 which is slidable in a longitudinal slot 21 in the said supporting bar. The said stamp bar is provided in the sides thereof with grooves 22 which receive tongues 23 that project from the sides of the slot to slidably retain the stamp bar therein. As shown in Figs. 5 and 6, the said stamp bar is yieldingly pulled towards the right by means of a coil spring 24 which rotates a pulley 25 which is rotatably mounted on a bracket 26, depending from the supporting bar 19, and is connected to the stamp bar 20 by means of a suitable cord 27 which extends around a pulley 28. A suitable post 29 is provided on the supporting bar in order to limit the movement of the stamp bar 20 towards the right.

The supporting bar 19 also carries an "In" stamp plate 30 and an "Out" stamp plate 31 which are stationary upon the bar 19 and located adjacent to the front edge of the stamp bar 20.

A "Day" stamp wheel 32 is rotatably mounted on a shaft 33 and between supporting brackets 34 and 35 which are secured to and depend from the supporting bar 19. This stamp wheel carries a ratchet 36 which is engaged by a pawl 37 that is pivotally carried on a lever 38 which is pivotally mounted upon the shaft 33. A retaining pawl 39 is pivotally mounted upon a stud 40 which is secured to the bracket 35 and the said retaining pawl engages the ratchet 36 for preventing reverse rotation of the stamp wheel 32 as it is rotated by the pawl 37 in the manner to be hereinafter described.

The stamp bar 20 has, upon its underside, a gear rack 41 which depends into a slot 42 in the supporting bar 19 and has a series of teeth thereon which engage a driving pinion 43 that is contained in a recess that extends from the slot 42 and is secured to an upright drive shaft 44 which extends through an opening in the bar 19; the said opening providing a bearing for rotatably supporting the upper end of the drive shaft while its lower end is rotatably supported in a bearing bushing 45 that is secured to the base plate 18.

The drive shaft is rotated by means of a ratchet wheel 46 which is rotatably mounted upon the bushing 45 and is driven by means of a driving pawl 47 that is pivotally carried on a driving lever 48 which is also pivotally mounted upon the bushing 45. The said lever is oscillated by means of an electric solenoid 49 that is mounted upon the base 5 and has a plunger 50 which is secured to the lever 48 by means of a link 51.

The said driving lever 48 is urged in a counterclockwise direction by a spring 52 and a stop 53 is provided upon the base plate 18 for limiting the movement of said lever in that direction. A retaining pawl 54 is pivotally mounted upon the base plate 18 and engages the teeth of the ratchet wheel 46 to prevent reverse movement of the said ratchet wheel during the operation of the driving pawl 47.

A holding pawl 55 is also mounted upon the base plate 18 and urged against a stop pin 55-a by means of a spring 55-b which holds said spring out of engagement with the ratchet wheel 46. A stud 56 is provided upon the lever 48 for operating the said pawl 55 as to be more fully described hereinafter.

The said ratchet wheel 46 is connected to the driving shaft 44 by means of a clutch mechanism which includes a sleeve 57 that is slidably mounted on the shaft 44 and keyed thereto as at 58. The said sleeve has a tooth 59 which engages a notch in the hub 60 on the ratchet wheel and releasably connects the shaft 44 to the said wheel. A clutch operating arm 61 is secured to a rocker shaft 62 which is rotatably mounted between the plates 15 and 17 and the said shaft has an arm 63 projecting therefrom for manually rocking the shaft. The arm 61 has clutch engaging fingers 64 which project into an annular groove 65 for rotatably and pivotally connecting the arm to the sleeve.

The said sleeve 57 has an annular groove 66 in the upper end portion thereof which receives the end of the lever 38. The shaft 62 also has secured thereto a rocker arm 67 which is connected to the plunger 68 of an electric solenoid 69 by means of a link 70 and a spring 71 is provided between the end plate 17 and the rocker arm 67 for urging rotation of the shaft 62 in a direction tending to force the sleeve 57 downwardly to hold the tooth 59 into engagement with the notch in the hub 60 and thereby normally retaining the driving connection between the ratchet wheel 46 and the drive shaft 44.

The stamping mechanism also includes an "In" stamping hammer 72 which is rigidly mounted upon a rocker shaft 73 and an "Out" stamping hammer 74 which is rigidly mounted upon a rocker shaft 75. The hammer 72 carries a stamping pad 76, which has stamping portions 76-a, 76-b and 76-c, and the hammer 74 carries a stamping pad 77, which has a stamping portion 77-a with an extension 77-b, for the purpose to be hereinafter described.

The rocker shaft 73 has at one end thereof a rocker arm 78 which is connected to the plunger of an electric solenoid 79 by means of a link 80, and the rocker shaft 75 has a rocker arm 81 at one end thereof which is connected to the plunger of an electric solenoid 82 by means of a link 83, a lever 84 that is pivoted upon the shaft 73, and a link 85.

The opposite ends of the shaft 73 and 75 each carry a finger 86 and 87, respectively, for operating a lever 88 which is pivoted at 89 and has a finger 90 that operates the push pin of an electric switch 91.

As shown in Fig. 4, the shaft 73 is rotated in a clockwise direction by means of a spring 92 which preferably extends around a hub 93 of a stop finger 94 which abuts a stop stud 95 on the end plate 16 and limits the clockwise movement of the hammer 72 under the pull of the spring 92. The shaft 75 also has a stop finger 96 which engages a stop stud 97 for limiting the counterclockwise movement of the hammer 74 under the pull of the spring 98.

An inked ribbon 99 is provided between the hammers 74 and 72 and the stamp bar 20 and the stamp wheel 32. This ribbon preferably extends from a spool 100, over a suitable shaft 101, over the stamps 29, 30, 31 and 32, the shaft 102 and onto a spool 103. A winding mechanism is preferably provided for winding the inked ribbon upon the spool 103. This mechanism includes a rocker lever 104 which is pivoted upon the stationary shaft 105 that supports the spool 103. A rocker arm 106 is secured to a shaft 107 which is rotatably mounted between the plates 16 and 17 and carries a rocker arm 108 thereon. The rocker arm 106 is connected to the lever 104, by means of a stud 109 that extends into a slot 110 in said lever, and a pawl 111 is carried by said lever and engages a ratchet 112 which rotates the spool 103 for winding the ribbon 99 onto said spool. The arm 108 is connected by means of a link 113 with the plunger 114 of an electric solenoid 115 which is controlled in the manner to be hereinafter described.

Figure 16:
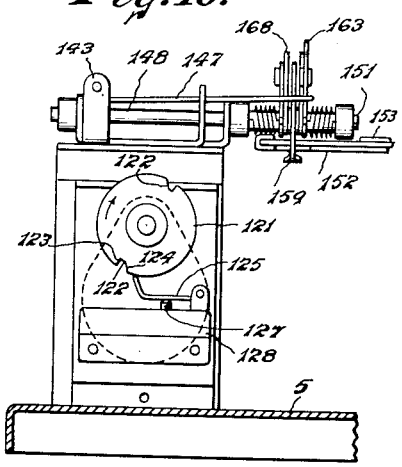
Fig. 16 is a front view of the said timing mechanism and a portion of the recording mechanism.
Figure 17:
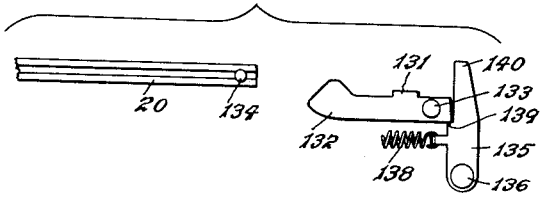
Fig. 17 is a plan view showing the mechanism for controlling the stamp bar return switch.

The timing mechanism for moving the stamp bar 20 and the stamp wheel 32 includes a synchronous electric motor, indicated at 116, which may be of a conventional type that commonly operates on alternating electric current and which is preferably mounted upon a bracket 117 that is secured to an upright frame 118. The said synchronous motor drives a train of gears, not shown, that is contained within a case 119 and rotates a shaft 120 which carries a cam wheel 121 that has a pair of opposed notches 122—122, each of which is shaped to provide an abrupt step 123 at one side thereof and a cam surface 124 at its opposite side, as clearly shown in Fig. 16 in which the cam wheel is rotated in a clockwise direction by the said synchronous motor. The said cam wheel operates a lever 125 which is pivoted at 126 and engages a push pin 127 of an electric switch 128 to control said switch for the purpose to be also hereinafter described.

A conventional electric clock 129 is mounted upon the frame 118 and the face thereof is exposed through an opening in the front panel 6. This clock is not a necessary element of my recorder, but is merely supplemental thereto and serves only for showing the time of the day.

The upright frame 118 also carries an electric switch 130 that has a push pin which is operated by the finger 131 which extends from a lever 132 that is pivoted at 133 and is operated by a pin 134 which projects from the stamp bar 20. The lever 132 is normally dogged in position, to retain the push pin of the switch 130 inwardly and the said switch in open position, by means of a dog 135 which is pivoted at 136 on a bracket 137 that is mounted on the upright frame 118 and is urged into dogging position by a spring 138. The said dog 135 has a detent 139 which engages the lever 132 and an extension 140 which is engaged by the pin 134 in the manner to be hereinafter more fully described.

As shown in Figs. 20 to 30, my improved recorder also includes a mechanism for controlling the operation thereof upon the insertion of a time card for a time recording operation. The said controlling mechanism includes a pair of switches 141 and 142 which are carried upon a supporting plate 143 that is mounted upon a supporting plate 144 which is adjustably secured to the upright frame 118 by means of a screw and slot connection 145. The said switches 141 and 142 are controlled by means of levers 146 and 147, respectively, which operate the push pins of said switches and are pivotally mounted upon a supporting shaft 148 that is carried by suitable bearings extending from the supporting plate 143.

The supporting plate 144 also carries a supporting shaft 149 which is non-rotatably mounted in bearings 150 that extend upwardly from the said supporting plate 144. The said shaft 149 has a portion 151 which extends over a card guide that includes a front portion constructed of a lower plate 152 and an upper plate 153, that extend inwardly from the front panel 6 of the casing, and a rear portion constructed of a lower plate 154, that is cut away to expose the inked ribbon 99 over the stamping portions of the stamp bar 20 and the wheel 32, and an upper plate 155; the said lower and upper plates of the guiding portions being separated to provide a passage for the time card which is aligned with an entrance opening 156 in the front panel and a clearance opening 157 in the rear panel of the case.

The said shaft 149 is prevented from rotating by being secured to a projecting portion 150-a of the bearing 150 and the said extending portion 151 of the shaft 149 carries a card-controlled mechanism for operating the switches 141 and 142. This mechanism includes a card-operated lever 158 having a foot portion 159 which extends through slots 160 and 161 in the upper plate 153 and the lower plate 152, respectively, and engages a stop surface 162 to limit the rotation of the said lever 158.

A card-operated lever 163 is also rotatably mounted upon the shaft extension 151 and has a finger 163-a which is engaged by the card as will be hereinafter described. The said lever 163 is urged in a clockwise direction by means of a torsion spring 164 which is anchored at one end to a stationary collar 165 on the shaft extension 151 and at its other end to the said lever 163. The said lever 163 is moved by means of a tappet 166 which is pivotally mounted upon the shaft extension 151 and connected to the lever 158 by means of a spring 167.

A separate operating lever 168 is also rotatably mounted upon the shaft extension 151 and has a finger 168-a which engages the time card. The said lever is urged in a clockwise direction by a torsion spring 169, which is anchored to the stationary bearing portion 150-a at one end and has its other end secured to the said lever 168, and is moved by a tappet 170 which is also pivotally mounted on the said shaft extension 151 and is connected to the lever 158 by a spring 171.

Spacing sleeves 172 and 173 are provided over the shaft extension 151 and within the torsion springs 169 and 164, respectively, to position the levers 158, 163 and 168, and the tappets 166 and 170 on said shaft extension.

The control mechanism also includes card-perforating punches 174 and 175 which are slidably mounted in a punch block 176 that is secured to the end plate 15. The said punches are operated by means of levers 177 and 178, respectively, which are secured to the punches by means of pins 179 and pulled in an upwardly direction and against a stop 180 by means of springs 181 and 182 that are anchored to a hanger 183 which extends inwardly from the stop plate 184 that is secured to the end plate 15.

The lever 178 is operated by means of a striker finger 185, which extends from the hammer 74, and the lever 177 is operated by a similar but longer striker finger 186 which extends from the hammer 72.

In order to convey the clippings that are punched out of the time cards by the punches 175 and 174, there is provided a suitable tube 187 which is connected to the bottom of the block 176 and leads to an opening in the base 5, not shown.

As shown in Fig. 31, the electric circuit for controlling my improved recorder is designed for a conventional 110-volt A. C. electric current to which it may be readily connected by a suitable attachment plug at the end of the lead wires 188 and 189 of the circuit. In addition to the above described electric solenoids and switches, the said circuit also includes a card controlled electric switch 190, that is suitably mounted on the lower plate 152 and is operated by a pivoted lever 191 which has a cam portion that extends through an opening 192 in the upper and lower plates of the front guide portion, a manual stamp actuating switch 194, a manual starter switch 194, a relay 195 which controls the switches 207 and 208, and the separate relay 196 which controls the switches 209 and 210.

Figure 18:
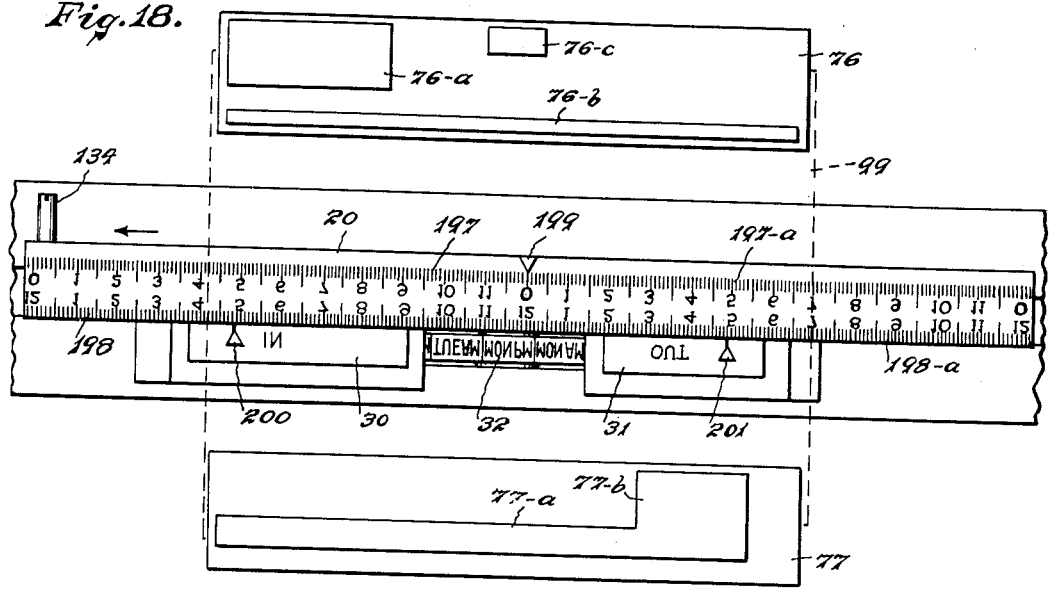
Fig. 18 is an enlarged plan view of a portion of the stamping mechanism.

As shown in Fig. 18, the stamp bar 20 carries thereon suitable stamping indicia in the form of raised numerals and graduations defining elapsed time scales 197 and 197-a and in-and-out scales 198 and 198-a. The said stamp bar also carries thereon an indicating arrow 199 which is in fixed position upon the stamp bar 20 and located at the zero point between the elapsed time scales 197 and 197-a.

The "In" stamp plate 30 has thereon indicia for an arrow 200 adjacent to the scale 198 and for the word "In." The "Out" stamp plate 31 also has thereon indicia for an arrow 201 adjacent to the scale 198-a, and for the word "out" as shown.

The stamp bar 20 will be in its starting position when the number "12," which is opposite the arrow 199, is in register with the "Out" arrow 201 and it will move from said starting position towards the left, and in synchronism with the electric motor 116, for the distance of 12 hours on said scale for each of the "AM" and "PM" periods denoted on the stamp wheel 32. The said stamp wheel is provided around its periphery with fourteen flat surfaces, indicated at 202, each of which carries thereon indicia to indicate the portion of the day of the week when a particular stamping operation is performed upon a time card. For instance, as shown in Fig. 18, the flat surface in stamping position carries the letters "TUE AM" to indicate that the stamping operation was performed in the A. M. of Tuesday of a particular week which may be separately inscribed upon the time card. The flat surface 202, which follows the surface just described, in the direction of the rotation of the wheel 32, carries the insignia for stamping "TUE PM" and the successive flat surfaces of said wheel carry stamping insignia in that order.

Figure 19:
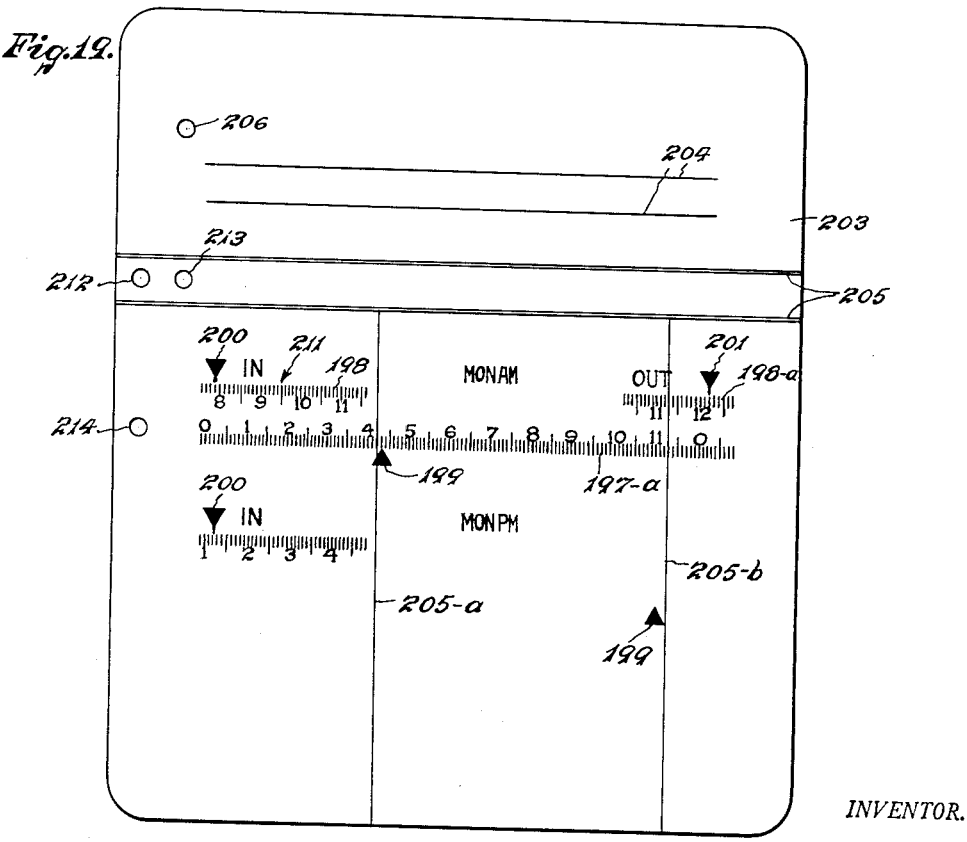
Fig. 19 is a plan view of a time card upon which time recordings have been stamped by my improved mechanism.

As shown in Fig. 19, the time card upon which time is recorded by my improved recorder comprises a blank 203 of a suitable material, such as pasteboard, upon which there are preferably printed lines, such as 204 and 205, for use when it is desired to inscribe upon the card identifying indicia such as the name of the worker and the date. The said blank is provided with the first perforation 206 for the purpose to be hereinafter described and, if desired, it may have printed thereon lines 205-a and 205-b for the purpose to be also hereinafter described.

The synchronous motor 116 is so geared that it will rotate the cam wheel 121 at a speed which will cause closing of the electric switch 128 and operation of the ratchet wheel 46, for the distance of one tooth thereof, once every three minutes. This will cause movement of the stamp bar 20 for a half of the distance between the graduations of the scales thereon and, since each graduation denotes one-tenth of an hour, or six minutes, each movement of the stamp bar 20 is for a distance corresponding to one-twentieth of an hour, or three minutes.

It will be noted that swinging movement of the lever 48 will cause the pin 56 to force the pawl 55 into engagement with the teeth of the wheel 46 so as to thereby prevent the said wheel to become rotated for more than the distance of one tooth by the force of its momentum.

When my improved recorder is to be conditioned for use it is first connected to a suitable electric current supply and the starter switch 194 is then manually closed to energize the relays 195 and 196, the coils of which are each connected at one side thereof directly to the secondary lead wire 188 of the circuit. The closing of the said starter switch 194 will connect the opposite side of the coil for the relay 195 to the main lead wire 189 and thus cause energization of said coil and the closing of the normally open switches 207 and 208. The said opposite side of the said coil is then connected to the main lead wire 189 through the switch 208 and the coil will remain energized after the starter switch 194 is released and permitted to open.

When the coil of the relay 195 is energized by the closing of the starter switch 194 and the switch 207 is closed, the current will flow through the main lead wire 189, the said starter switch 194, the relay switch 207 and the card-controlled switch 190 to the opposite side of the coil of the relay 196. This will cause the energization of said coil and the closing of the normally open switches 209 and 210 of said relay 196. The said opposite side of the coil of the said relay will then be connected to the main lead wire 189 through the switch 209, the hammer-controlled switch 91, the switch 207 and the switch 208 so that the said coil of the relay 196 will also remain energized after the starter switch 194 is released and permitted to open.

When the starter switch 194 has been momentarily closed and the relays 195 and 196 have been energized, as just above described, the day stamp wheel 32 is set to correspond with the particular day by manually operating the lever 63 to rock the shaft 62 and thereby cause raising of the sleeve 57. This will operate the lever 38 and cause the pawl 37 to rotate the said stamp wheel, a step for each operation of the arm 63, and move into stamping position the indicia thereon which corresponds to the day of the week on which the said stamp wheel 32 is so set.

The raising of the sleeve 57 with the clutch tooth 59 thereon will cause the shaft 44 to become disengaged from the ratchet wheel 46 so that it can rotate freely. This will cause the stamp bar 20 to be pulled towards the right by the return spring 24 until the said bar is engaged by the stop pin 29 and located in its starting position. The said stamp bar is then moved from its starting position to the position which will correspond with the correct time of the day by manually closing and opening the switch 193 which will cause the current to flow from the main wire 189 through the said switch 193 to the coil of the solenoid 49 and thereby energize the said solenoid and cause swinging movement of the lever 48. The pawl 47 will then rotate the ratchet wheel 46 which will, through the tooth 59 and the sleeve 57, rotate the shaft 44 with the pinion 43 thereon and cause movement of the stamp towards the left, for a distance of one-half of a graduation for each closing of the switch 193, until the said stamp bar has been moved to the position wherein the arrows 200 and 201 are in register with the graduations of their respective portions of the scale 198 and 198-a on the bar 20 which correspond to the time of the day.

When the stamp bar 20 and the stamp wheel 32 have been properly set to correspond with the day and the time, as above described, the recorder is in condition to be used for stamping operations upon time cards. The said stamping operations are clearly illustrated in Fig. 18, which shows a plan view of the stamp members with the stamping pads 76 and 77 thereof being shown in inverted position relatively to said stamp members.

The time card 203 with time recordings stamped thereon is clearly illustrated in Fig. 19 and the stamping operations of my improved recorder, which will be clearly understood from examination of Figs. 18 to 30, and are performed as follows:

Assuming that a first stamping operation is to be performed on the time card 203 to record the starting time of the worker on a particular job and that the said operation is performed on Monday A. M. at 7.9 o'clock. At that time the graduations indicating 7.9 on the stamp bar 20 are opposite the "In" and the "Out" arrows and the indicia "MON AM" on the wheel 32 is in stamping position. The card 203, with only the perforation 206 therein, is inserted in the entrance opening 156 in inverted position and with the bottom edge thereof leading. As the said card is then pushed inwardly, between the plates 152 and 153, it will engage the foot portion of the lever 158 and rock said lever in a counterclockwise direction as clearly shown in Fig. 23. This movement of the lever 158 will cause the springs 167 and 171 to pull the tappets 166 and 170, respectively, and said tappets will rotate the levers 163 and 168, also in a counterclockwise direction, until the fingers 163-a and 168-a of said levers, respectively, engage the surface of the card. Such movement of the card will cause the finger 163-a to enter the perforation 206, as shown in Fig. 25, and this will rock the lever 163 further, in the counterclockwise direction, until it forces the lever 147 downwardly and causes closing of the electric switch 142. This will cause energization of the solenoid 79, through the selector switch 141, and operation of the "In" hammer 74 which carries the stamping pad 76. The portion 76-a of said pad will then strike the time card over the "In" stamp bar 30 and the "In" portion of the stamp bar 20 and stamp upon the time card the impression indicated at 211 which will include the arrow 200, the "In" and the portion of the scale 198 which is in register with said arrow at the time and thereby record upon the time card the "In" time of the worker on the particular job which is identified upon the time card. At the same time that the impression 211 is stamped upon the time card, the pad portion 76-c will also strike the card over the stamping wheel 20 and stamp upon the card the "MON AM" so that the said "In" time will read "7.9 MON AM" as shown in Fig. 19.

While the "In" time is being stamped upon the card, the stamp portion 76-b will also strike the card over the arrow 199 and stamp the impression of said arrow upon the time card in the position which will correspond with the portion of the scale 198 that is included in the impression 211.

It is to be noted that, since the said arrow 199 is fixed upon the stamp bar 20 opposite the "0" point between the elapsed time scales 197 and 197-a, it travels with the scales 198 and 198-a so that, wherever an impression from the said arrow is stamped upon the time card at the time that the "In" impression 211 is stamped, it will be located at the starting point of the elapsed time scale 197-a, or at the point where the "0" of the said scale is located at the time that the arrow 199 is stamped upon the card.

Also at the same time that the said "In" stamping impression is made upon the card by the operation of the hammer 72, the finger 186 of said hammer will strike the lever 177 and operate the punch 175 so that it will make the perforation 212 in the said card to position it for the next, or "Out," stamping operation thereon.

While the time card is inserted in the recorder for a stamping operation, such as above described, it will depress the lever 191 and open the switch 190 so that the electric current will flow from the main wire 189 to the relay 196 only through the switches 208, 207, 91 and 209; then, as the hammer 72 strikes over the stamp card, the finger 86 will strike the lever 83 and open the switch 91 and thereby cause the coil of the relay 196 to become de-energized so that the switch 210 will open and break the circuit to the solenoid 79, even though the switches 142 and 141 are still in their closed position, while the card is in stamping position, and thereby prevent the repeating of a stamping operation upon the time card while it is still in the recorder and until it is withdrawn therefrom and the relay 196 is again energized by the closing of the switch 190.

When the operator finishes or leaves the job, he inserts the card into the recorder for an "Out" stamping operation and this operation is performed as follows:

As the card is inserted into the guide between the plates 152 and 153, it will rock the lever 158, as above described, and move the levers 163 and 168 so that their fingers will engage the card as shown in Fig. 23. Further movement of the card will cause the finger 168–a of the lever 168 to enter the perforation 212 and rock the said lever into the position shown in Fig. 27 wherein it will depress the bar 146 and move the switch 141 to disconnect the solenoid 79 and connect the solenoid 82 in series with switch 142. Further movement of the time card will then cause the finger 163–a of the lever 163 to again enter the perforation 206 and rock the said lever into the position shown in Fig. 27 wherein it will depress the lever 147 and thereby close the switch 142 and cause energization of the solenoid 82 and operation of the "Out" hammer 74.

The operation of the said hammer 74 will cause the pad 77–a and the extension 77–b thereof to strike the card over the elapsed time scale 197 and stamp a portion 197–a of said scale adjacent to the arrow 199 which was stamped on said card with the preceding "In" stamping operation. The said arrow will then point upon said stamped portion 197–a exactly to the amount of elapsed time between the times of the "In" and "Out" stamping operations. At the same time that the "Out" stamping operation is performed the pad extension 77–b will strike the card over the "Out" stamp bar 31 and the portion of the scale 198–a which is adjacent thereto, at the time that the said "Out" stamping operation is performed, and thereby cause to be stamped upon the card the said portion of the scale, the word "Out" and the arrow 201; the said arrow pointing to the indicia upon said scale which will indicate the exact time of the "Out" stamping operation.

It will be clearly seen in Fig. 19 that, as the result of the above described first two stamping operations, there has been recorded upon the time card shown that the operator went in at 7.9 o'clock on Mon. A. M., went out at 12.2 o'clock and that the elapsed time, or the time spent on a particular job, was 4.3 hours. During the "Out" stamping operation, the striker finger 185 struck the lever 178 and operated the punch 174 so that it cut the perforation 213 in the card.

Assuming that the operator returns in the afternoon of the same day and inserts the card at 1.25 o'clock, the inward movement of said card will cause both the fingers 163–a and 168–a to enter the perforations 213 and 212, respectively, and thereby rock the levers 163 and 168 into the position shown in Fig. 29 wherein the lever 168 does not engage the bar 146, but the lever 163 will operate the lever 147 and thereby causes energization of the solenoid 79 and an "In" stamping operation upon the card which, as shown thereon, will indicate that the worker went in on the job at "1.25 Mon. PM." This "In" stamping operation will have also stamped the arrow 199 upon the card, in the manner above described, which arrow is to indicate the elapsed time when the "Out" stamping operation is performed. The said latter "In" stamping operation will also have caused the punching of the perforation 214 in the card so that, when the card is inserted for the "Out" stamping operation, it will cause the lever 168 to be swung to the position shown in Fig. 27 and depress the bar 146 before the lever 163 is swung to the position shown in said Fig. 27 and operates the bar 147, as hereinbefore described, to cause the recorder to perform the "Out" stamping operation.

The lines 205–a and 205–b are printed upon the time card blank when the worker is to be paid only for the actual elapsed time after certain regular hours and not for any "early" time which may show upon the card when the "In" time is stamped before the regular hours. Therefore, the line 205–a is positioned upon the card so that the arrow 199 will be stamped directly upon said line when the "In" stamping operation is performed exactly at the worker's regular starting time in the "A. M." and the line 205–b is positioned upon the card so that the said arrow 199 will be stamped directly upon said line 205–b when the "In" stamping operation is performed exactly at the worker's starting time for the "P. M." Therefore, when an "In" stamping operation for the "A. M." is performed before the regular starting time, or early, the impression from the arrow 199 will be stamped at the right of the line 205–a and when late the said impression will be stamped at the left of the line. Similarly, when an "In" stamping operation for the "P. M." is performed early, the impression from the arrow 199 will be stamped upon the card at the right of the line 205–b and when late at the left of said line as shown in Fig. 19.

It will be noted that the lines 205–a and 205–b on the card 203 of Fig. 19 are so spaced, relatively to the position of the "In" arrow 200, that the said card is adapted for use by a worker whose regular hours start at 8. o'clock in the A. M. and at 1. o'clock in the P. M. The "In" stamping operation on said card for Monday A. M. was performed at 7.9 o'clock, which was .1 of an hour early. The impression of the arrow 199 was therefore stamped upon the card at a distance of .1 to the right of said line. Since the operator stamped "Out" at 12.2, the elapsed time was the 4.3 hours which the arrow 199 indicates upon the card but, since the operator is not to be paid for the "early" time, the actual time for which he is to be paid is 4.2 hours and that is the amount of time indicated by the said line 205.

Since, as shown upon said time card, the "In" operation was performed at 1.25 o'clock and the operator was supposed to start at 1. o'clock, the impression of the arrow 199 was stamped upon the card at the left of the line 205–b so that, when the elapsed time scale for the P. M. is stamped upon the card adjacent to the arrow 199, the said arrow will indicate the total amount of elapsed time for which the worker is to be paid.

It will be clearly understood from the above description that, by providing the time card blank with the lines 205–a and 205–b and locating them in accordance with the regular starting times of the worker, the said lines will show at a glance the elapsed time for which the worker is to be paid, by simply reading there the proper one of said lines which crosses the elapsed time scale, and the arrow 199 will show the actual amount of elapsed time. Also, when the said lines 205–a and 205–b are used, it may be seen at a glance whether any "In" stamping operation was performed early or late by just noting whether the arrow 199 is at the left or at the right of the corresponding one of said lines. Therefore, if it is seen that the "In" stamping operation was performed late, the elapsed time for which he is to be paid will be that which is indicated by the arrow 199. If the said stamping operation was performed early, the elapsed time will be read by the proper one of the lines 205–a or 205–b, depending upon whether it is for the A. M. or the P. M.

It will be also understood that the stamp wheel 32 is rotated for the distance of one of the surfaces 202 thereof each time that the stamp bar has moved for the distance of twelve hours from its starting position against the stop post 29, in which position the arrow 199 is opposite the "Out" arrow 201. This twelve hour movement of the stamp bar 20 will carry the said arrow 199 from the said "Out" arrow 201 to the "In" arrow 200. When the arrow 199 has reached a position opposite the arrow 200 whereis one step, or one-half of a graduation, away from being in register with the arrow 200, the next operation of the cam wheel 121, which closes the switch 128 and brings the arrow 199 into register with the arrow 200, will cause the pin 134 to trip the dog 135 and release the lever 132. This will cause the switch 130 to close and thereby connect the solenoid 69 to the main wire 189, through the said switch 128, and thereby cause energization of said solenoid and operation of the rocker shaft 62 which will then raise the sleeve 57, disengage the tooth 59 from the ratchet wheel 46 and cause the stamp bar 20 to be pulled back to its starting position against the stop post 29 in which position of said bar the arrow 199 will be in register with the "Out" arrow 201. It will, therefore, be understood that the stamp wheel 32 is rotated so as to bring a P. M. or an A. M. into stamping position after each twelve hour movement of the stamp bar.

The total amount of elapsed time which may be recorded in my recorder is twelve hours and the correct amount of elapsed time will be recorded even when the period between the "In" and "Out" stamping times are extended over a time when the stamp bar is returned to its starting position, and this is accomplished in the following manner: Assuming that it is 11. A. M. when an "In" stamping operation is performed; the numeral 11 will then be in a position wherein it is in register with the arrow 200 and the arrow 199 will be one hour away from said position. The stamping operation will then stamp an impression upon the card showing the arrow 200 opposite the numeral 11 of the scale 198 and the arrow 199 in its respective position. Continuing timed movement of the stamp bar 20 will bring the arrow 199 into register with the arrow 200 at the expiration of the remaining one hour before the "12." at which time the pin 134 will operate the dog 135, as above described, and the stamp bar is returned to its starting position for the P. M., the stamp wheel 32 is rotated to bring "MON PM" into stamping position, the arrow 199 will move into register with the arrow 201 and the "0" at the left end of the stamp bar will be in register with the arrow 200. At this time, the numeral "1." on the elapsed time scale 197 will be in register with the position in which the arrow 199 was stamped upon the card. Now, assuming that the worker is about to perform an "Out" stamping operation upon the card, at 4 P. M.: at that time, the numeral "4" of the "Out" scale 198–a will be in register with the arrow 201 and the numeral "5" of the elapsed time scale 197 will be in register with the position where the arrow 199 was located at the time that it was impressed upon the time card with the "In" stamping operation. The impression which is stamped upon the card by the "Out" stamping operation will, therefore, show that the worker stamped "Out" at 4:00 o'clock, but the total elapsed time was five hours and this includes the one hour which remained between the "In" stamping operation, at 11:00 o'clock, and the return of the stamp bar 20 to its starting position at 12:00 o'clock. It will be seen that any elapsed time which remains on the scale 197–a and expires between the "In" stamping operation and the time when the numeral "12" reaches the arrow 200 and the stamp bar is returned to its starting position, will be added to the elapsed time which expires after the said stamp bar has returned to its starting position since the return of the stamp bar 20 will bring the scale 197 into register with the position at which the arrow 199 was impressed upon the card in exactly the same position as the scale 197–a was with relation to the said position of the impression of the arrow 199 before the return of the stamp bar to its starting position.

Each time that the switch 142 is closed for a stamping operation upon the time card, the solenoid 115 will be energized by being connected to the main wire 189 through the said switch 142 and the switches 210, 209, 91, 207 and 208. The said solenoid will then rock the lever 104 and rotate the ribbon spool 103 to thereby feed the said ribbon through the stamping mechanism.

The spacing between completed stamped records upon a time card may be altered as desired by merely loosening the screw 145 and adjusting the plate 144 so as to move the entire card-controlled mechanism thereon nearer to or farther from the punches 174 and 175 and thereby varying the distance between the perforations upon the time card.

It is desired to have it understood that the periods of time indicated on the type bar 20 need not be limited to twelve hour periods and that the movement of said bar need not be limited to once every three minutes.

If desired, the type indicia on the bar 20 may be made to indicate dollars and cents, instead of time, so that monetary amounts may be recorded by my improved recorder instead of time periods.

I claim:

1. A time recording device for stamping upon a card "In" time, "Out" time, and elapsed time in between; said device having a stamping mechanism including a bar movable from a starting position and having thereon a pair of elapsed time scales running along one side thereof, an "In" and an "Out" time scale opposite to the elapsed time scales and in register therewith and an arrow adjacent to and in register with the zero position between the elapsed time scales, a pair of stationary spaced arrows adjacent to each of the "In" and "Out" scales, the said arrows being spaced for a distance equal to the length of one of said latter scales, and means for returning the said movable member to its starting position after having travelled the length of one of the scales thereon, said device including a stamp wheel disconnected from the movable member and located between the said spaced arrows for denoting the A. M. and P. M. of the days of the week, and means for changing the position of said stamping wheel upon each return of the stamp bar to its starting position.

2. A recording device for stamping upon a card "In" and "Out" times, the elapsed time in between and the day of the week, said device having a stamping mechanism including a bar movable from a starting position, stamping indicia on said bar including a pair of elapsed time scales running along one side of the bar, an "In" and an "Out" scale running along the opposite side of the bar and in register with the elapsed time scales, an arrow fixed upon said bar and positioned adjacent the zero point between the said elapsed time scales, spaced and stationary "In" and "Out" arrows disconnected from the said bar and located respectively adjacent to the "In" and "Out" scales on the bar, a day stamp wheel disconnected from said bar and located between the said "In" and "Out" arrows, a time controlled electric switch, a solenoid controlled by said switch, mechanism operated by said solenoid for moving the stamp bar upon each operation of the time controlled switch, a separate electric switch operable upon the said bar having travelled the distance of the length of one of the scales thereon, and a separate solenoid controlled by said separate switch for rotating the said stamp wheel to place a different stamping portion thereof into stamping position.

3. A time recording device having a stamping mechanism including a movable bar, stamping indicia carried by said bar, a gear rack on said bar, a pinion in mesh with said gear rack, a drive shaft for rotating said pinion, a ratchet wheel, clutch means between said drive shaft and ratchet wheel, a time-controlled solenoid for rotating said ratchet wheel to move said bar, an electric switch adapted to be operated upon the said bar reaching a predetermined position, and a separate solenoid controlled by said electric switch and adapted to operate the clutch to disengage the drive shaft from the ratchet wheel and means operable upon disengagement of the drive shaft from the ratchet wheel for returning the bar to its starting position.

4. A time recording device as set forth in claim 3 including a stamping wheel having indicia thereon denoting week days, and means actuated upon the clutch disengaging operation of the separate solenoid to cause rotation of said stamp wheel.

5. A time recording device having a stamping mechanism including a movable bar having stamping indicia thereon, a gear rack on said bar, a pinion in mesh with said gear rack, a drive shaft connected to said pinion, a ratchet wheel, a clutch between said ratchet wheel and drive shaft, a time-controlled solenoid for intermittently rotating said ratchet wheel at timed intervals, an electric circuit, an electric switch in said circuit adapted to be closed upon the said bar having moved to a predetermined position, a separate solenoid controlled by said switch and operable to actuate the clutch and disengage the drive shaft from the ratchet wheel, means for returning the bar to starting position upon the said drive shaft being disengaged from the ratchet wheel, a stamp wheel having indicia thereon denoting the days of the week, and means operable simultaneously with the disengaging operation of the clutch for rotating said stamp wheel.

6. A recording device having a stamping mechanism including stamping indicia, means including a slot in said device for positioning a time card in stamping position relatively to said indicia, a first electric switch, a first stamping hammer adapted to be operated upon the closing of the said first electric switch to strike the card and cause a stamped impression thereon of a portion of the said indicia, a second stamping hammer, a second electric switch, means operable upon the closing of said second electric switch to cause striking of the said second stamping hammer to strike the card and cause a stamped impression thereof of a different portion of the indicia, a first rocker lever having a finger thereon engageable with a perforation in the time card and an extension adapted to operate the first electric switch to close said switch and thereby cause operation of the first stamping hammer, and a second rocker lever, having a finger thereon engageable with a different perforation in the time card for rocking said lever and an extension engageable with the second switch for closing it to cause operation of the said second stamping hammer when the second perforation has moved past the said finger of the second rocker lever.

7. A time recording device having a stamping mechanism including stamping indicia, means including a slot in said device adapted to position a time card relatively to the said indicia upon being inserted into said slot, a first stamping hammer for stamping a portion of said indicia upon the card by a first stamping operation, a second stamping hammer for stamping a different portion of the indicia upon the card on a second stamping operation, an electric selector switch including a normally closed first and a normally open second switch, means controlled by the said first switch for causing operation of the first stamping hammer, means controlled by the second switch for causing operation of the second stamping hammer, a third switch in series with said first and second switches, a first rocker lever having a finger thereon for rocking it upon engagement with a perforation in the time card, an extension on said first rocker lever for operating the third switch to thereby cause operation of the first stamping hammer through said first electric switch, a second rocker lever having a finger thereon engageable with a separate perforation in the time card for rocking it, and an extension on said second rocker lever for operating the selector switch for causing opening of the first switch and closing of the second switch upon the said time card having been moved to a position wherein the separate perforation is carried past the finger of the second rocker lever; the said second rocker lever being incapable of operating the selector switch until the separate perforation in the time card has moved past the finger thereof.

8. A time recording device having a stamping mechanism including stamping indicia, means including a slot in said device for positioning a time card relatively to said indicia, a first stamping hammer adapted to strike said card and cause an impression of a portion of said indicia to be stamped thereon, a second stamping hammer for causing a different portion of the said indicia to be stamped upon the card, a selector switch including a first normally closed switch and a second normally open electric switch, means controlled by the first electric switch for operating the first stamping hammer, means controlled by the first electric switch for operating the said second stamping hammer, a third switch in series with said first and second switches, a first and second rocker lever, each of said levers having a finger thereon, a separate lever operable upon the insertion of the card into said device for rocking the said first and second levers to bring the fingers thereof into engagement with the surface of the time card, the said fingers being engageable with separate perforations in the time card to rock said first and second levers, a projection on the first lever for operating the third switch to cause operation of the first stamping hammer through the said third and first switches, and a projection upon the second lever for operating the selector switch to open the first and close the second switches and thereby permit operation of the second stamping hammer through the third and second switches.

9. A time recording device having a stamping mechanism including a movable bar having indicia thereon, means for moving said bar, a time-controlled switch for intermittently causing operation of said bar moving means, means including an entrance slot in said device for positioning a time card relatively to said indicia, a first stamping hammer for causing a portion of said indicia to be stamped upon the card, a second stamping hammer for causing a different portion of the indicia to be stamped upon the card, a first solenoid for controlling the operation of the first stamping hammer, a second solenoid for controlling the operation of the second stamping hammer, a selector switch including a normally closed switch in series with said first solenoid and a normally open switch in series with the second solenoid, a normally open third switch in series with the selector switch, means controlled by the card upon its insertion in the slot for a first stamping operation to close the third switch and cause energization of the said solenoid through the said first and third switches, and additional means controlled by the card upon the insertion thereof in the said slot for a second stamping operation to cause opening of the first switch and closing of the second switch whereupon the closing of the third switch will cause energization of the second solenoid and performance of the second stamping operation upon the card.

10. In a recording device of the character described having a stamping mechanism including stamping indicia, means including a slot in said device for positioning a time card relatively to said indicia, a first stamping hammer for causing a first stamping operation upon said time card, a second stamping hammer for causing a second stamping operation upon the time card, an inking ribbon positioned between said card and the indicia, an electric circuit, a first solenoid in said circuit for operating the said first stamping hammer, a second solenoid in said circuit for operating the said second stamping hammer, a third solenoid in said circuit for moving said stamping indicia from a starting position, a fourth solenoid in said circuit, means controlled by said fourth solenoid for returning said stamping indicia to said starting position upon having travelled a predetermined distance therefrom, a fifth solenoid in said circuit for feeding said ribbon, a series of relays in said circuit each including separate electric switches controlling said circuit, card-controlled switches for controlling the operation of said first, second and fifth solenoids, a manually operable starting switch for causing energization of said relays to close the separate switches thereof, a time-controlled switch in series with the said third solenoid for causing intermittent movement of the stamp bar, and a manually operable switch for manually controlling the said third solenoid.

11. In a recording device of the character described having a stamping mechanism including stamping indicia, means including a slot in said device for positioning a time card relatively to said indicia, a first stamping hammer for causing a first stamping operation upon said card, a second stamping hammer for causing a second stamping operation upon the time card, an electric circuit, a first solenoid in said circuit for operating the said first stamping hammer, a second solenoid in said circuit for operating the said second stamping hammer, a time-controlled third solenoid in said circuit for moving said stamping indicia from a starting position, a fourth solenoid in said circuit, means controlled by said fourth solenoid for returning the said stamping indicia to said starting position upon having travelled a predetermined distance therefrom, a first and second relay in said circuit, each of said relays including a plurality of electric switches, a manually operable starter switch in series with the coil of the first relay, the said coil of the first relay being also in series with one of the switches thereof, a time card controlled selector switch having a normally closed switch in series with the second solenoid, a time card controlled operating switch in series with the said selector switch and with a switch of the second relay, a normally closed time card controlled switch in series with one of the switches of the first relay and with the coil of the second relay, a normally closed stamping hammer controlled switch in series with the said one of the switches of the first relay and also in series with the coil of the second relay through one of the switches thereof, a manually operable starting switch in series with the coil of the first relay, a manually operable switch in series with the third solenoid, a time controlled switch in series with said third solenoid, and a normally open switch in series with the time controlled switch and fourth solenoid and operable upon the said stamping indicia having reached a predetermined starting position.

12. For a time recording device having a stamping mechanism including means for stamping in a predetermined position upon a time card the time of a first stamping operation and an arrow for subsequently denoting upon said card the elapsed time between said time of the first stamping operation and the time of a second stamping operation; a time card blank having a line thereon positioned with respect to the said predetermined position whereby, when the said first stamping operation is performed at a predetermined time, the said arrow will be stamped in register with the said line.

13. For a time recording device having a stamping mechanism including means for stamping in a predetermined position upon a time card the time of a first stamping operation and an arrow for subsequently denoting upon said card the elapsed time between said time of the first stamping operation and the time of a second stamping operation; a time card blank having lines thereon positioned with respect to the said predetermined position whereby, when the said first stamping operation is performed at a predetermined time, the said arrow will be stamped in register with one of said lines.

14. For a time recording device having a stamping mechanism including a stamp bar having stamping indicia thereon including an "In" scale, scales for elapsed time, an elapsed time arrow carried upon said bar adjacent to the zero point between the elapsed time scale, an "In" arrow adjacent to the said "In" scale, the said stamping bar being movable relatively to said "In" arrow, means for stamping upon a time card with a first stamping operation an impression of a portion of the "In" scale and the "In" arrow adjacent thereto to indicate the actual time of the said "In" stamping operation, and an impression of the said elapsed time arrow, a time card blank adapted to be positioned in said device to receive the stamping impression from the said first stamping operation with the said "In" arrow in a predetermined position upon said blank, the said blank having a line spaced from the said predetermined position whereby, when the said "In" stamping operation is performed at a predetermined time, the stamped impression of the elapsed time arrow will be in register with the said line.

15. For a time recording device having stamping mechanism including a stamp bar with stamping indicia thereon including an "In" time scale, an "Out" time scale, a pair of elapsed time scales having a zero point therebetween, an arrow on said bar adjacent to said zero point, a stationary "In" arrow adjacent to the "In" time scale, a stationary "Out" arrow adjacent to the "Out" time scale, stamping indicia between said "In" and "Out" arrows for denoting the days of the week and the A. M. and P. M. thereof, the said stamping bar being movable relatively to the said "In" and "Out" arrows and the stamping indicia therebetween, means for stamping upon a time card a portion of the "In" scale with the "In" arrow adjacent thereto denoting the actual time of the "In" stamping operation, the elapsed time arrow and the day of the week, separate means for subsequently stamping upon said card a portion of the "Out" scale with the "Out" arrow adjacent thereto indicating the actual time of the "Out" stamping operation and a portion of the elapsed time scale adjacent to the impression of the elapsed time arrow previously stamped upon the card; a time card blank adapted to be positioned within said device to receive the impression from the "In" stamping operation with the "In" arrow thereof in a predetermined position upon said blank, the said blank having a pair of spaced lines thereon positioned relatively to the predetermined position of the "In" arrow whereby when the "In" stamping operation is performed upon the blank at a predetermined time in the A. M. the elapsed time arrow will be stamped in register with one of said lines and when the "Out" stamping operation is performed at a predetermined time, the said elapsed time arrow will be stamped in register with the other of said lines.

References Cited in the file of this patent

UNITED STATES PATENTS

| 1,124,419 | Goss et al. | Jan. 12, 1915 |
| 1,215,532 | Hitchcock et al. | Feb. 13, 1917 |
| 1,300,909 | Wilson | Apr. 15, 1919 |
| 1,421,824 | Odell | July 4, 1922 |
| 1,582,333 | Bryce | Apr. 27, 1926 |
| 2,496,686 | Williams | Feb. 7, 1950 |